(12) United States Patent
Chirravuri et al.

(10) Patent No.: US 12,418,535 B1
(45) Date of Patent: Sep. 16, 2025

(54) MANAGING SECURITY OF CRYPTOMINING DEVICES

(71) Applicant: Auradine Inc., Santa Clara, CA (US)

(72) Inventors: Sridhar Chirravuri, Sunnyvale, CA (US); Marshall Long, Sugar Land, TX (US); Robert Ashley, San Jose, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/033,077

(22) Filed: Jan. 21, 2025

(51) Int. Cl.
*H04L 9/40* (2022.01)
(52) U.S. Cl.
CPC ................... *H04L 63/101* (2013.01)
(58) Field of Classification Search
CPC .................................................... H04L 63/101
See application file for complete search history.

(56) References Cited

U.S. PATENT DOCUMENTS

| | | | | |
|---|---|---|---|---|
| 7,315,887 | B1 * | 1/2008 | Liang | G06Q 10/087 705/28 |
| 2017/0339165 | A1 * | 11/2017 | Be'Ery | H04L 63/1408 |
| 2019/0243970 | A1 * | 8/2019 | Vinogradov | G06F 21/554 |
| 2019/0364057 | A1 * | 11/2019 | Hazay | H04W 24/08 |
| 2020/0104489 | A1 * | 4/2020 | Park | G06F 21/566 |
| 2022/0253795 | A1 * | 8/2022 | Gersbach | G06Q 10/087 |
| 2024/0414076 | A1 * | 12/2024 | Reid | H04L 43/0876 |

* cited by examiner

*Primary Examiner* — Yonas A Bayou

(74) *Attorney, Agent, or Firm* — Fish & Richardson P.C.

(57) ABSTRACT

A method includes detecting, by an electronic device managing a plurality of integrated circuit (IC) chips, an attempt to modify a whitelist that includes multiple entries of URLs and user IDs and determining whether the attempt is associated with modifying an existing entry, removing the existing entry, or adding a new entry of a URL or a user ID to the whitelist. When the attempt is associated with removing an existing entry corresponding to a particular URL or user ID, the method includes further determining whether the particular URL or user ID is being actively used by IC chip(s). When the attempt to modify or remove the existing entry or add a new entry of a URL or user ID to the whitelist is approved, a notification is transmitted to an electronic communication channel associated with a root administrator and pool managing administrators that manage one or more pool servers.

20 Claims, 5 Drawing Sheets

MANAGING SECURITY OF CRYPTOMINING DEVICES

TECHNICAL FIELD

This disclosure relates generally to systems for managing security of cryptomining devices.

BACKGROUND

Cryptomining devices, e.g., electronic devices such as application specific integrated circuit (ASIC) chips, may be utilized to perform tasks such as high data-rate collaborative computations to solve mathematical problems related to generation of cryptocurrencies. Before a cryptomining device (also referred to as a cryptomining asset) performs a task, the asset may need to be configured, e.g., with network-specific settings and user identification associated with the asset.

SUMMARY

Implementations according to this disclosure includes a method for enhancing security for a cryptomining pool, e.g., a plurality of cryptomining devices or assets performing collaborative computations to solve mathematical problems. The method includes: detecting, by an asset management server, an attempt to modify at least one of (i) a first uniform resource locator (URL) or (ii) a first user identification (ID) data associated with a pool server managing a plurality of IC chips configured to perform high data-rate mathematical computations, to at least one of (i) a second URL or (ii) a second user ID data, respectively; determining, by the asset management server, whether (i) the second URL or (ii) the second user ID data matches information in one of a plurality of entries in a whitelist, where each entry of the plurality of entries comprises a URL and a corresponding user ID; in response to a determination that the second URL or the second user ID data matches information in one of the entries in the whitelist, approving the attempt; and in response to a determination that the second URL or the second user ID data does not match information in any of the entries in the whitelist, (i) rejecting the attempt and (ii) transmitting, by the asset management server to an electronic device associated with the attempt, a notification indicating that the second URL or the second user ID data is not recognized.

Implementations according to this disclosure includes another method for enhancing security for cryptomining pool. The method includes: detecting, by a device controller managing a plurality of IC chips configured to perform high data-rate mathematical computations, an attempt to modify at least one of (i) a first uniform resource locator (URL) or (ii) a first user identification (ID) data associated with a pool server to (i) a second URL or (ii) a second user ID data, respectively; determining, by the device controller, whether (i) the second URL or (ii) the second user ID data matches information in one of a plurality of entries in a whitelist, where each entry of the plurality of entries comprises a URL and a corresponding user ID; in response to a determination that the second URL or the second user ID data matches information in one of the entries in the whitelist, approving the attempt; and in response to a determination that the second URL or the second user ID data does not match information in any of the entries in the whitelist, (i) rejecting the attempt and (ii) transmitting a notification indicating a message that the second URL or the second user ID data is not recognized.

Implementations according to this disclosure includes another method for enhancing security for cryptomining pool. The method includes: detecting, by an electronic device managing a plurality of IC chips configured to perform high data-rate mathematical computations, an attempt to modify a whitelist that comprises a plurality of entries, where each entry of the plurality of entries comprises a URL and a corresponding user ID; and determining whether the attempt is associated with modifying an existing entry, removing the existing entry, or adding a new entry of a URL or a user ID to the whitelist. Moreover, the method further includes, in response to a determination that the attempt is associated with removing an existing entry corresponding to a particular URL or a particular user ID: determining whether the particular URL or the particular user ID is being actively used by one or more IC chips for performing high data-rate mathematical computations; and based on a determination that the particular URL or the particular user ID is not being actively used by the one or more IC chips, (i) approving the attempt, and (ii) transmitting, to an electronic communication channel associated with a root administrator and one or more pool managing administrators that manage the pool server, a first notification indicating that the existing entry of the whitelist has been removed. Moreover, the method further includes, in response to a determination that the attempt is associated with modifying an existing entry or adding a new entry to the whitelist, (i) approving the attempt, and (ii) transmitting, to the electronic communication channel associated with the root administrator and the one or more pool managing administrators, a second notification indicating that the new entry has been added or the existing entry of the whitelist has been modified.

The details of one or more disclosed implementations are set forth in the accompanying drawings and the description below. Other features, aspects, and advantages will become apparent from the description, the drawings and the claims.

DETAILED DESCRIPTION

Figure 1:
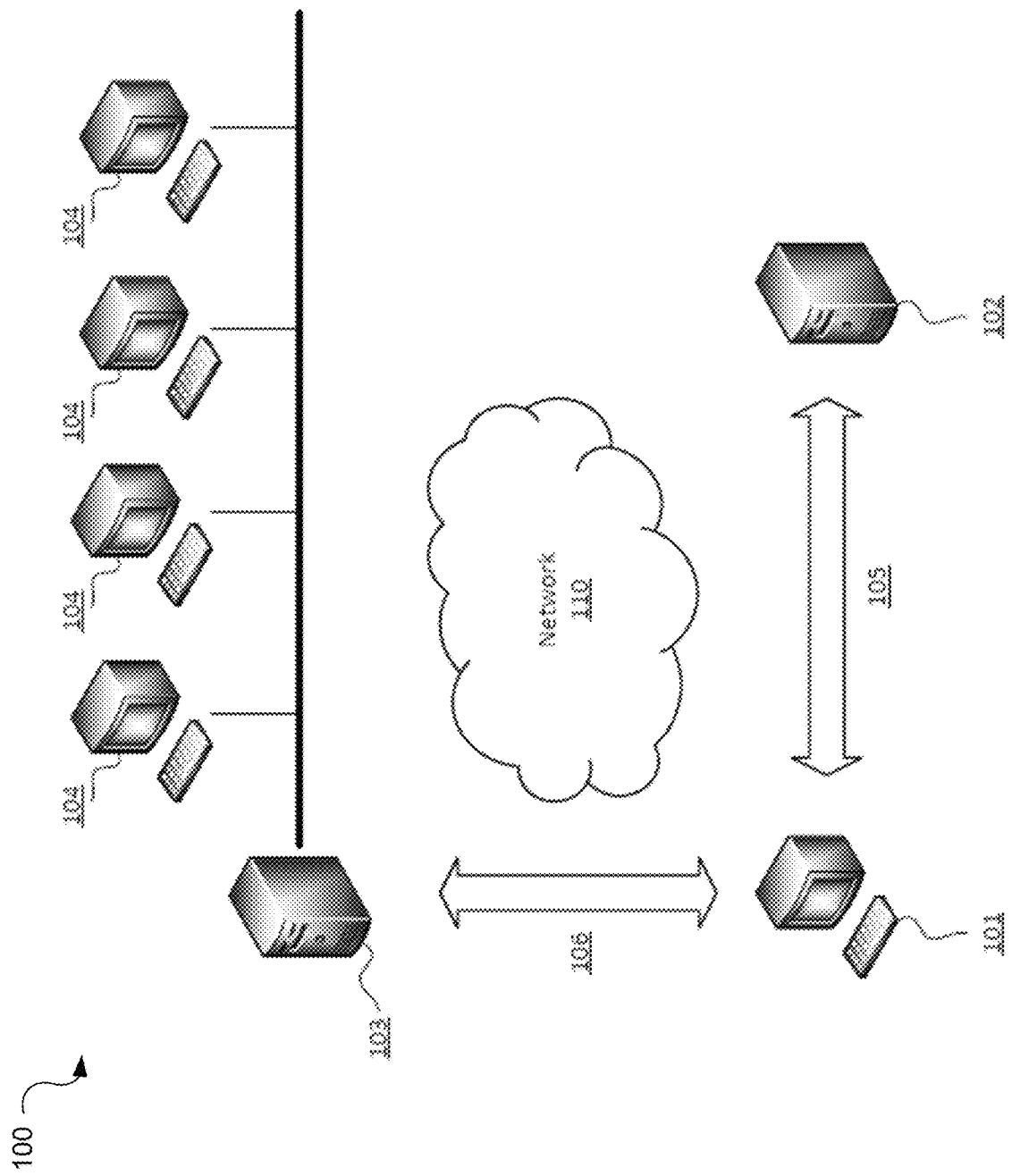
FIG. 1 illustrates an example cryptomining asset management system, according to some implementations.

Cryptomining tasks often involve a large number of cryptomining assets each performing similar computations to collaboratively resolve one or more complex computing problems. Cryptomining assets working on the same computing problems are sometimes organized as a pool, managed by a pool server. The pool server can, e.g., authenticate the credentials of new assets being added of the pool, allocate pool resources (such as network bandwidth) to assets that belong to the pool, and reward individual assets based on their contribution to the task. To effectively and efficiently perform a cryptomining task as part of a pool, an asset loads various configurations that are often pool-specific. Example pool configurations include network address of the pool server (e.g., uniform resource locator (URL)) and user identification (user ID) data for accessing pool resources, level and type of computing power contributed by an asset to the pool, and goal of the cryptomining task (e.g., generating or mining a cryptocurrency such as BITCOIN, ETHER, XRP, Solana, Dogecoin, among others, and/or performing other mathematical computations). In some implementations, a pool configuration can include at least a pool URL and a user ID (which can include further user credentials such as user password). For instance, a pool configuration can include information regarding where mining assets hash and mine, and user information regarding such mining assets.

Managing cryptomining configurations across a large number of cryptomining assets and pools at a data center (e.g., asset management server) may be challenging. Each asset can be configured with pool-specific settings including the pool server's network address and user ID data. However, ensuring that these configurations remain secure and consistent across all assets is difficult, particularly in large-scale operations. Moreover, unauthorized changes to the configuration settings of cryptomining assets pose a risk. Bad actors with access to the mining devices or network may modify critical settings, such as the pool URL or user identification related data. This can result in the redirection of mining tasks or rewards to unauthorized accounts, causing financial losses to the legitimate operator of, or associated with, the mining asset. As such, mechanisms for enhancing security while managing cryptomining asset configurations are desirable.

Implementations according to this disclosure describes methods for enhancing security of cryptomining devices that are performing tasks in cryptomining pools. As described below, some implementations pre-configure a whitelist that includes a list of URLs of pool servers and user IDs and runs a check against the whitelist when an attempt to change a URL or a user ID associated with a mining asset to a different URL or a different username is detected. For instance, if the different URL, the different username, or the combination thereof does not pass the security check against the whitelist, then such attempt may not be approved. In some examples, the whitelist can only be configured or modified by a root administrator (e.g., a super admin) associated with an enterprise or other entity that manages one or more cryptomining pools. In some examples, the whitelist can only be configured or modified by the root administrator or one of multiple pool administrators, where a pool administrator is configured to manage a subset of a plurality of cryptomining pools associated with an enterprise.

Moreover, as described below, some implementations describe security measures when an attempt to modify the whitelist is detected, in which the attempt to modify can involve modifying an existing entry, removing the existing entry, or adding a new entry of a URL or a user ID. For instance, even if the whitelist can only be configured or modified by a certain authorized user (e.g., root administrator, one or more pool administrators) and even if such authorized user modifies the whitelist, notifications can be sent to multiple (or all of) the pool administrators such that relevant stakeholders are aware of such change. By doing so, this can prevent, for instance, a scenario where a bad actor (e.g., which could be one of the authorized user or who is in disguise of the authorized user) within the same company or entity that operates one or more cryptomining assets or manages the pool configurations attempts to modify the whitelist. Moreover, in some examples, when the attempt is associated with removing the entry of the URL, such attempt can be rejected when the URL is being actively used by one or more cryptomining assets for mining.

Such automated process requires very limited human involvement and can significantly improve security of cryptomining pools, efficiency of cryptomining tasks being performed by a pool of cryptomining assets, or both. In doing so, an enterprise that owns or manages one or more cryptomining pools will avoid resource wastage due to unauthorized or spurious use, e.g., lose money to bad actors who may be associated with the enterprise, or other external parties who attempt to control assets in the cryptomining pool.

FIG. 1 illustrates an example cryptomining asset management system 100, according to some implementations. The cryptomining asset management system 100 includes cryptomining asset 101, asset management server 102, and pool server 103 which manages a pool of cryptomining assets 104 that are configured to perform a cryptomining task. These components are communicatively connected by network 110, which can be a public network, such as Internet, or a private network, or a combination of both. Moreover, the cryptomining asset 101 can be included in, or can be part of, the pool of the cryptomining assets 104.

The cryptomining asset management system 100 can include multiple pool servers and corresponding pool of cryptomining assets that belong to each of the multiple pool servers, respectively. For instance, there can be three pool servers and three corresponding pools of cryptomining assets. For instance, (i) a first pool server can perform operations for mining a first cryptocurrency or manage pool of cryptomining assets configured to perform operations corresponding to the first cryptocurrency, (ii) a second pool server can perform operations for mining a second cryptocurrency or manage a pool of cryptomining assets configured to perform operations corresponding to the second cryptocurrency, and (iii) a third pool server can perform operations for mining the second cryptocurrency or manage a second pool of cryptomining assets configured to perform operations corresponding to the second cryptocurrency. There can be less than or more than three pool servers and three mining pools of cryptomining assets, and these pool servers and/or mining pools can be configured to perform other operations, e.g., corresponding to other cryptocurrencies or perform computations for other tasks that may not be related to cryptocurrencies. Additionally, although the following sections describe various techniques with respect to cryptomining assets and pools configured to mine cryptocurrencies, these techniques are also applicable to pools of ASIC chips that are configured to perform other collaborative high data-rate computations.

The cryptomining asset (such as cryptomining asset 101 or cryptomining assets 104) can each refer to (i) a processor-based electronic device that can perform computation tasks involved in mining cryptocurrencies, (ii) one or more specialized IC chips, such as application-specific integrated circuits (ASICs) configured for high-speed, high-efficiency mathematical computations required in cryptocurrency mining, etc.

In some implementations, cryptomining asset 101 can establish first network connection 105 with asset management server 102. Via network connection 105, cryptomining asset 101 can modify (e.g., add, change, or remove) pool configurations (including URL and user ID (e.g., username, user credentials)) from asset management server 102, as will be further described below. Using the pool configurations, cryptomining asset 101 can establish second network connection 106 with pool server 103 to access pool resources managed by pool server 103 and perform the cryptomining task.

In some implementations, in instances where each of the cryptomining assets corresponds to one or more IC chips, such as ASICs, the cryptomining asset management system 100 can further include a device controller (e.g., control board) that manages such IC chips. For instance, the device controller can be a processor-based electronic device or software component that coordinates and manages the operations of the IC chips. In some implementations, the device controller and the IC chips can be mounted on a printed circuit board (PCB). In some implementations, the device controller can be a separate device housed within the same chassis as the PCB or different enclosure. In some implementations, the device controller can be a separate component that is communicatively connected (e.g., in network connection with) the IC chips. In some implementations, one device controller can manage all of the IC chips (cryptomining assets) within a pool. For instance, the device controller can manage the pool of cryptomining assets 104 or the pool server 103.

Figure 5:
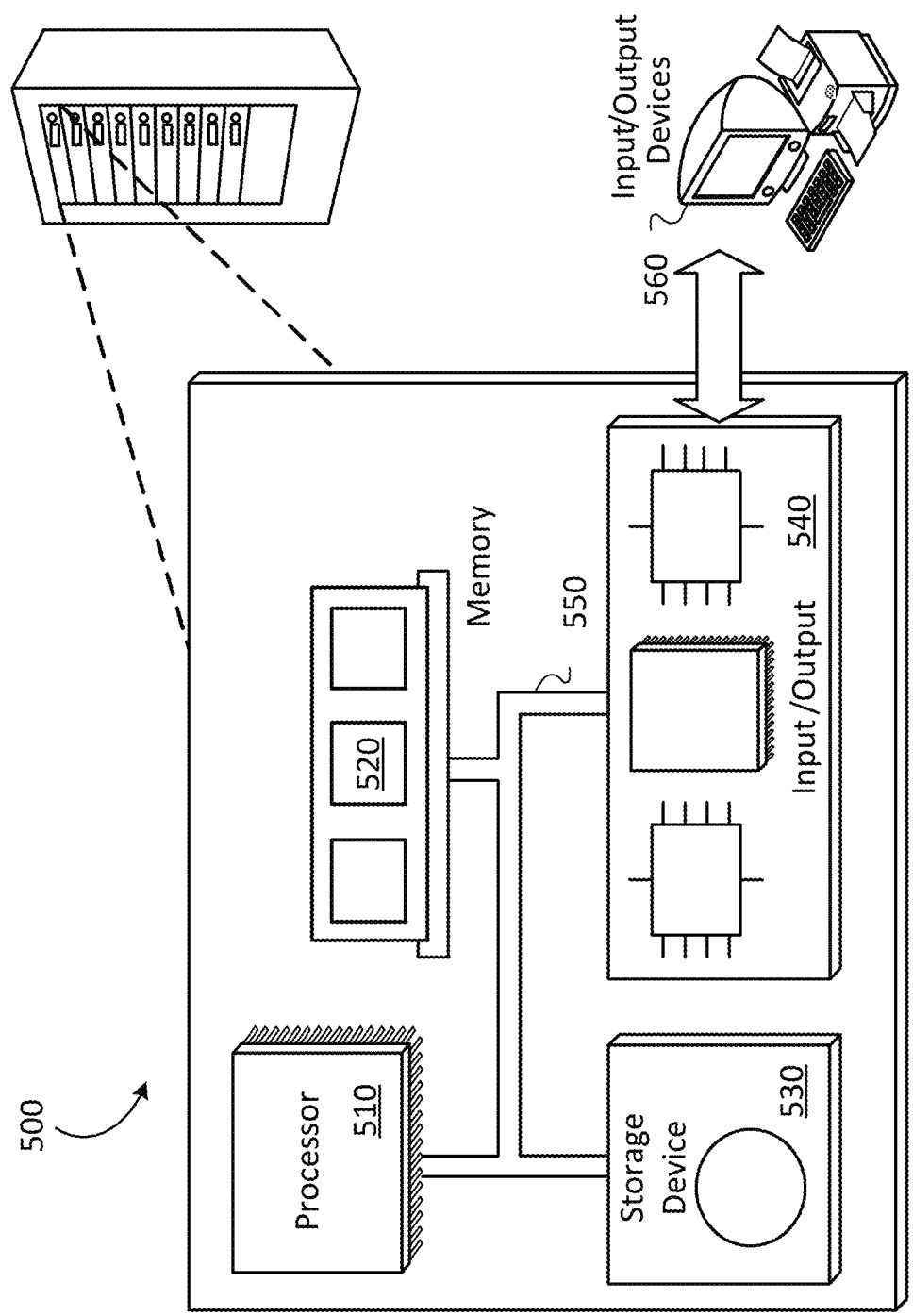
FIG. 5 is a block diagram of an example computer system, according to some implementations.

In some implementations, a separate user device computing device, such as the computing system 500 of FIG. 5, can establish a network connection with asset management server 102 to manage the asset management server 102. For instance, the separate user device can change, add, or remove pool configurations or user ID (e.g., username) from asset management server 102. In some implementations, the root administrator, the one or more pool managing administrators, or local device administrator (e.g., user tied to a local cryptomining asset such as the cryptomining asset 101) can use the separate user device. In some implementations, the root administrator can use the separate user device to modify (e.g., add, change, or remove) one or more entries of whitelist. In some implementations, the root administrator and the one or more pool administrators can use the separate user device to modify one or more entries of whitelist or modify pool configurations (including URL and user ID). In some implementations, the local device administrator can use the separate user device to modify the pool configuration associated with its local device or specific cryptomining asset 101.

Figure 2:
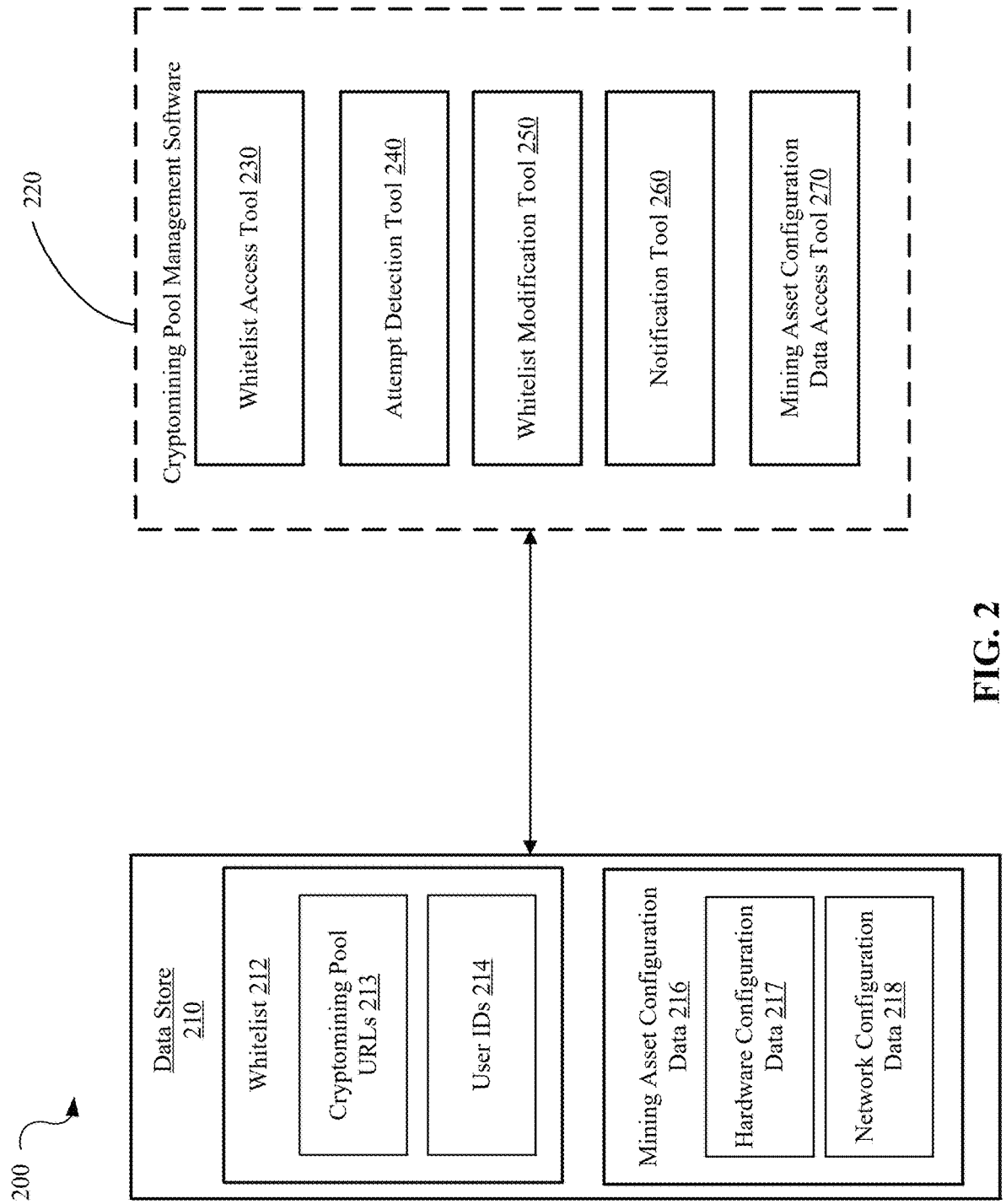
FIG. 2 illustrates an example implementation of a cryptomining pool management software (or algorithm) that is utilized by a processor-based electronic device or a server.

FIG. 2 is an example implementation 200 of a cryptomining pool management software 220 (or algorithm) that is utilized by a processor-based electronic device or a server. For instance, the cryptomining pool management software 220 can be utilized by a cryptomining asset (e.g., the crytomining asset 101 of the cryptomining asset management system of FIG. 1), a device controller (e.g., the device controller described above), an asset management server (e.g., the asset management server 102), or a pool server (e.g., the pool server 103). In some implementations, the cryptomining pool management software 220 can run as an endpoint application on the cryptomining asset, the device controller, or the asset management server. Moreover, for instance, the cryptomining pool management software 220 can be utilized by other separate user device (e.g., the separate user device described above) or the pool server. In some implementations, the server can also be the processor-based electronic device.

In particular, the cryptomining pool management software 220 can be utilized by the electronic device or the server to thereby manage or operate a cryptomining pool (e.g., the cryptomining pool of the pool server 103) with enhanced security. For instance, the cryptomining pool management software 220 can be utilized to at least [1] configure a whitelist that includes a list of URLs of one or more pool servers and corresponding user ID data (e.g., user IDs), [2] detect (i) an attempt to modify (e.g., change, add, or remove) a URL or a user ID associated with a mining asset (e.g., URL or user ID of cryptomining pool configuration) and (ii) an attempt to modify (e.g., change, add, or remove an entry of) the whitelist, [3] run security check against the whitelist, [4] grant or reject access based on the security check, and [5] transmit notification (e.g., to an electronic communication channel).

Further, the example implementation includes a data store 210. The data store 210 can include, or correspond to, a data store of the electronic device or the server. In particular, the data store 210 can be one or more memory of the asset management server or the pool server. In some implementations, the data store 210 can be one or more memory of the crytomining asset, the device controller, or the other separate user device. In some implementations, the data store 210 can be one or more storage devices 530 of the electronic device (which can also be a server) of the system 500. The data store 210 can be in data communication with the electronic device or the server. For instance, the data store 210 can be in data communication with the cryptomining asset, the device controller, the other separate user device, the asset management server, or the pool server.

The data store 210 can include a whitelist 212 (e.g., one or more whitelist data and mining asset configuration data 216 (e.g., one or more configuration data for each of the mining assets associated with the pool). The whitelist 212 can include a list of entries of pool URLs 213 (e.g., URL data) and user IDs 214 (e.g. user ID data).

In some implementations, the whitelist 212 can be a configuration file that can include multiple pieces of information. For example, the configuration file can specify a list of the URLs or other network links of one or more respective pool servers, that one or more users (of the corresponding cryptomining assets) are authorized to access. For instance, prior to participation in the mining pool, each of the users of the corresponding cryptomining assets or each of the cryptomining assets can be assigned (e.g., by the asset management server) to one of the cryptomining pool based on the user's purchase, subscription, preference, etc. As such, the configuration file can include a list of entries of user IDs 214 that are tied to a respective URL of a respective pool. In some examples, each of the entries can include both the URL and the user ID as a tuple. In some examples, each of the entries can include only one of the URL or the user ID.

In some implementations, the whitelist 212 can include multiple entries, where each entry of the multiple entries includes a URL and a corresponding user ID. For example, for illustrative purposes, ten users can assigned to a first BITCOIN mining pool having a specific URL and ten user IDs that belong to the ten users can be assigned to that specific URL, and these information (e.g., with the specific URL and each user ID in each entry) can be listed as pre-configured entries in the whitelist 212.

In some implementations, the user IDs 214 can include access credentials to the pool server, such as a username and a password, that the user obtained in advance based an authorization obtained from an operator of the pool server or from pool managing administrator(s) of the pool server.

In some implementations, each of the user IDs 214 can be linked to a cryptocurrency wallet of a user (e.g., via digital address or other means).

The whitelist 212 can be only configured by authorizer user(s). In some implementations, a root administrator of the pool server can be the only authorized user or entity to modify the whitelist 212. For instance, the root administrator can be an entity or a user that acts as a primary authority (e.g., super admin), overseeing the entire cryptomining platform and performing duties such as managing system-wide user IDs, credentials, pool server URLs, and asset allocations across multiple pools. In some examples, the root administrator can enforce global policies and maintain server infrastructure. In some examples, the root administrator can supervise pool-managing administrators and also directly manage one or more specific pools. In some implementations, the root administrator can manage the asset management server.

In some implementations, in addition to the root administrator, pool managing administrators that manage one or more specific pools can modify the whitelist 212. In some examples, the pool managing administrators can be responsible for the operational management of one or more specific pools, maintain pool-specific user IDs, issue access credentials, and manage and configure URLs for miner connections. In some examples, the pool managing administrators can monitor hashrates and payouts, and resolve disputes or technical issues within their assigned pools.

In some implementations, the pool managing administrators can include the root administrator. In some implementations, modifying the whitelist 212 can include changing an existing entry, removing the existing entry, or adding a new entry of a URL or a user ID to the whitelist 212.

Moreover, the mining asset configuration data 216 can include hardware configuration data 217 and network configuration data 218 of each of mining assets that are associated with (or assigned to) the pool. In some implementations, the hardware configuration data 217 and the network configuration data 218 can be associated with each of the respective user IDs 214. For instance, the hardware configuration data 217 can include information about a PCB on which the IC chips (e.g., the mining assets) are mounted, information about a chassis in which the printed circuit board is housed, or any other information that can identify hardware of a mining asset (e.g., that belongs to the pool and is tied to a certain user ID). For instance, the network configuration data 218 can include stored internet protocol (IP) address or any other network addresses associated with the mining asset.

Further, in some examples, the data store 210 or the mining asset configuration data 216 of the data store 210 can include data regarding pool configurations (e.g., the pool configurations described above). For instance, the mining asset configuration data 216 can include pool URLs and user ID data (which can include further user credentials such as user password) regarding cryptomining assets of one or more pools. Moreover, for instance, the mining asset configuration data 216 can further include goal of the cryptomining task. In some implementations, the data store 210 or the mining asset configuration data 216 of the data store 210 can receive (e.g., in real-time or whenever the data store 210 is in network connection with one or more mining devices or the pool server) the pool configurations from the one or more mining devices or the pool server. Such whitelist 212 and the mining asset configuration data 216 can be accessed and used by the cryptomining pool management software 220, as further described below.

As explained to some extent, at least some of implementations described above can be implemented as respective software programs that can be executed by the electronic device or the server (which can also be the electronic device). A software program can include machine-readable instructions that may be stored in a memory (such as the data store 210, a memory 520, the storage device(s) 530 of FIG. 5), and that, when executed by the processor, cause the processor-based electronic device to perform the instructions of the software program. As shown, the cryptomining pool management software 220 can include a whitelist access tool 230, an attempt detection tool 240, a whitelist modification tool 250, a notification tool 260, and a mining asset configuration data access tool 270. In some implementations, the cryptomining pool management software 220 can include more or fewer tools. In some implementations, some of the tools may be combined, some of the tools may be split into more tools, or a combination thereof. In some implementations, the cryptomining pool management software 220 can be run on the server or both the electronic device and the server. In some implementations, cryptomining pool management software 220 can be run on the asset management server. In some implementations, cryptomining pool management software 220 can be run on the device controller.

In some implementations, the whitelist modification tool 250 and the notification tool 260 can take a form of a software different from the cryptomining pool management software 220 and run on the server, while the other tools can take a form of the cryptomining pool management software 220 and run on the electronic device that is in data communication with the server, and vice versa. Further variations with respect to the whitelist modification tool 250, the notification tool 260, and other tools being a separate software and being run on the electronic device, the server, or combination thereof, are possible.

The whitelist access tool 230 can be used to access the whitelist 212 stored in the data store 210. For instance, the whitelist access tool 230 can include a computer executable function or instructions with respect to accessing entries of pre-configured list of the cryptomining pool URLs 213 and the user IDs 214. In some implementations, the whitelist access tool 230 can be operable (or accessing the whitelist 212 can be allowed) only when an electronic device attempting to modify the pool configuration or the whitelist 212 is in network connection with the asset management server. In some implementations, the whitelist 212 can only be stored in or accessed at the asset management server.

The attempt detection tool 240 can be used to detect an attempt to modify (e.g., add, change, or remove) the pool configuration data. For instance, the attempt detection tool 240 can be used to detect an attempt to change (e.g., rename) a first URL associated with a cryptomining pool (and the cryptomining pool server thereof) or a first user ID associated with the cryptomining pool to a second URL or a second user ID, respectively. Moreover, for instance, the attempt detection tool 240 can be used to detect an attempt to add or remove the first URL or the first user ID.

In some implementations, such attempts can be made at, or through, the electronic device or the server. For instance, such attempts can be made, or through, the cryptomining asset, the other separate user device, the asset management server, the pool server, or the like. In some implementations, within the same pool (and thus within the same URL), attempt to change or rename a user ID can be detected. For instance, an attempt to modify a user ID or user credentials thereof can be detected. In some implementations, without changing the user ID, attempt to change or rename the URL can be detected. In some implementations, attempt to change or rename both the user ID and the URL can be detected. In some implementations, attempt to add or remove (e.g., delete) the user ID or the URL can be detected. In some examples, attempt to modify the user ID or credentials thereof can be detected.

Further, in some examples, such pool configuration data (user ID, URL, etc.) associated with the attempt (or subject to modification via the attempt) can correspond to one of pool configurations in the pool configuration data (user ID, URL, etc.) of the mining asset configuration data 216.

Moreover, the attempt detection tool 240 or the cryptomining pool management software 220 can run a check against the whitelist 212 when the attempt to modify the pool configuration is detected. For instance, it can be determined as to whether (i) the second URL (to which the user is attempting to change or rename from the first URL) or (ii) the second user ID (to which the user is attempting to change or rename from the first user ID) matches at least one of entries in the whitelist 212. For instance, the second URL or the second user ID can be compared to each of the entries having the URLs 213 and user IDs 214. Moreover, in the instances where the attempt is associated with removing or adding URL or user ID, it can be determined as to whether the URL or the user ID matches at least one of entries in the whitelist 212.

When the second URL or the second user ID matches at one or more of the entries in the whitelist 212, the attempt detection tool 240 or the cryptomining pool management software 220 can approve the attempt and modify (e.g., allow modification of) the first URL or the first user ID to the second URL or the second user ID as requested (or attempted). When the attempt to change both the first URL and the first user ID to the second URL and the second user ID has been detected, then the cryptomining pool management software 220 can approve the attempt and modify accordingly only when each of both the second URL and the second user ID matches corresponding entry, respectively, in the whitelist 212. Moreover, in the instances where the attempt is regarding removing or adding URL or user ID, if it is determined that the URL or the user ID matches at least one of entries in the whitelist 212, then the attempt detection tool 240 or the cryptomining pool management software 220 can approve the attempt and modify (in this case, adding or removing at least one of the URL or the user ID) the whitelist 212. Further, in some cases, when the URL or the user ID is removed from the pool configuration data, then the notification tool 260 can transmit a notification to emails or other electronic communication channels associated with the root administrator and one or more pool managing administrators.

When the second URL or the second user ID does not match any one of the entries in the whitelist 212, the attempt detection tool 240 or the cryptomining pool management software 220 can reject or transmit computer executable instructions to reject the attempt. For instance, in response to a determination of a rejection, the notification tool 260 can transmit a first notification associated with the rejection or a second notification that conveys a message that the second URL or the second user ID data is not recognized. For instance, the second notification can indicate that the second URL or the second user ID data is not in the registered list (such as the whitelist 212) or indicate that the user must modify the whitelist 212. Such notifications can be transmitted to the electronic device for user display. In some implementations, such attempts or notifications can be stored as data structure in the data store 210. In some implementations, the notifications can be sent to an electronic communication channel associated with the root administrator and one or more pool managing administrators. Similarly, in the instances where the attempt is regarding removing or adding URL or user ID, if it is determined that the URL or the user ID does not match at least one of entries in the whitelist 212, then the attempt detection tool 240 or the cryptomining pool management software 220 can reject the attempt. In these instances, the same technique regarding the rejection and notification can be applied here as described above with respect to the attempt associated with changing or renaming the first URL or the first user ID to the second URL to the second user ID.

Further, the attempt detection tool 240 can be used to detect an attempt to modify (e.g., add, change, or remove one or more entries of) the whitelist 212. For instance, the attempt detection tool 240 can be used to detect an attempt to modify at least one of entries of the cryptomining pool URLs 213 or the user IDs 214 in the whitelist 212.

In some implementations, the process of detecting the attempt to modify the whitelist 212 can include determining whether an authorized user or entity attempted to modify the whitelist 212. For instance, a root administrator of the pool server can be the only authorized user or entity to modify the whitelist 212. In some implementations, pool managing administrators that manage the pool can also be authorized to modify the whitelist 212. In some implementations, the pool managing administrators can include the root administrator. In some implementations, modifying the whitelist 212 can include changing (e.g., renaming) an existing entry, removing the existing entry, or adding a new entry of a URL or a user ID to the whitelist 212.

In some implementations, when the user associated with the attempt is a local device administrator (e.g., the local device administrator described above) or a user tied to the cryptomining asset, but not the root administrator nor the pool administrator, the user does not qualify as an authorized user and cannot modify the whitelist 212. However, in some instances, such user can view the whitelist 212.

For instance, in response to determining that the attempt was made by the authorized user or entity, the attempt detection tool 240 or the cryptomining pool management software 220 can proceed to next steps in conducting further checks.

In some implementations, after the authorized user or entity validation process is complete and/or in response to a determination that the attempt is associated with removing the existing entry of the URL or the user ID, the attempt detection tool 240 or the cryptomining pool management software 220 can determine whether the URL or the user ID is being actively used by one or more cryptomining assets (e.g., for mining purposes or other purposes that align with purposes or goals of the pool server).

For instance, if it is determined that the URL or the user ID is being actively used by the one or more cryptomining assets, the attempt can be rejected. For instance, if it determined that the URL or the user ID is not being actively used by the one or more cryptomining assets, the attempt can be approved. Moreover, for instance, if the attempt is approved, the whitelist modification tool 250 can modify the whitelist 212 accordingly. In some instances where each of the entries of the whitelist 212 includes both the URL and the user ID as a tuple, the modification includes removing the entire tuple of the entry. Moreover, the notification tool 260 can transmit a notification to emails or other electronic communication channels associated with the root administrator and multiple pool managing administrators that manage one or more pool servers, where the notification can convey a message that the one or more existing entries of the whitelist 212 has been removed. For instance, even when only one user or one entity, such as the root administrator, makes the modification (which is removal in this instance), the notification is transmitted to the multiple pool managing administrators as well as the root administrator. In some examples, the notification is transmitted to all of the pool managing administrator in addition to the root administrator.

In some implementations, where each of the entries of the whitelist 212 includes both the URL and the user ID as a tuple and the modification includes removing the entire tuple of the entry, check or comparison can be made against the pool configuration data (including the URLs and the user IDs) of the mining asset configuration data 216. For example, when such entry exists (or matches any entry) in the pool configuration data, removal attempt would be rejected. In some examples, such check against the pool configuration data can be considered as part of, or correspond to, determination of whether or not the URL or the user ID is being actively used by the one or more cryptomining assets. As such, in these implementations, if the authorized user wants to remove the entry of the whitelist 212, the authorized user first needs to remove corresponding {URL, User ID} configuration from the pool configuration data, and thereafter, remove the entry of the whitelist 212. Further, in some implementations, the notification can be transmitted to the root administrator and one or more pool managing administrators in response to a determination that (i) the tuple entry of the URL and the user ID (in the whitelist 212) subject to removal does not exist in the pool configuration data and (ii) the attempt has been made by the authorized user.

In some implementations, after the authorized user or entity validation process is complete and in response to a determination that the attempt is associated with changing the existing entry or adding the new entry of the URL or the user ID, the attempt detection tool 240 or the cryptomining pool management software 220 can approve the attempt. Thereafter, the whitelist modification tool 250 can modify the whitelist 212 accordingly. In some instances where each of the entries of the whitelist 212 includes both the URL and the user ID as a tuple, the modification includes changing or adding an entire tuple of the entry. Moreover, the notification tool 260 can transmit a notification to emails or other electronic communication channels associated with the root administrator and multiple pool managing administrators that manage one or more pool servers, where the notification can convey a message that the one or more existing entries of the whitelist 212 has been modified. For instance, even when only one user or entity, such as the root administrator, makes the modification, the notification is transmitted to the multiple pool managing administrators as well as the root administrator. In some examples, the notification is transmitted to all of the pool managing administrator in addition to the root administrator.

In some implementations, prior to transmittal of the notification conveying that the one or more existing entries of the whitelist 212 has been modified, the mining asset configuration data access tool 270 can access the data store 210 and the mining asset configuration. Moreover, the mining asset configuration data access tool 270 can further obtain, in real-time, a network address (e.g., IP address) of the server (e.g., the pool server, the asset management server, etc.) or the electronic device (e.g., the mining asset, the other separate user device, etc.) that is making the attempt. By doing so, the notification can include data representing one or more of data from the mining asset configuration data 216 and the real-time obtained data of the network address (of the device or the server that is making the attempt). In some implementations, the notification can include notification data representing one or more of (i) stored mining asset configuration data 216 associated with the user ID data or access ID data, (ii) an IP address of a user that made the attempt to modify the whitelist, and (iii) information conveying what has been modified. Moreover, in some implementations, such notifications can be stored as data structure in the data store 210.

In some implementations, the whitelist modification tool 250 or the cryptomining pool management software 220 can generate the whitelist 212. For instance, authorized user (e.g., the root administrator) can newly create the whitelist. In some instances, the authorized user can further include one or more pool managing administrators for generating the whitelist 212.

Example Processes

Figure 3:
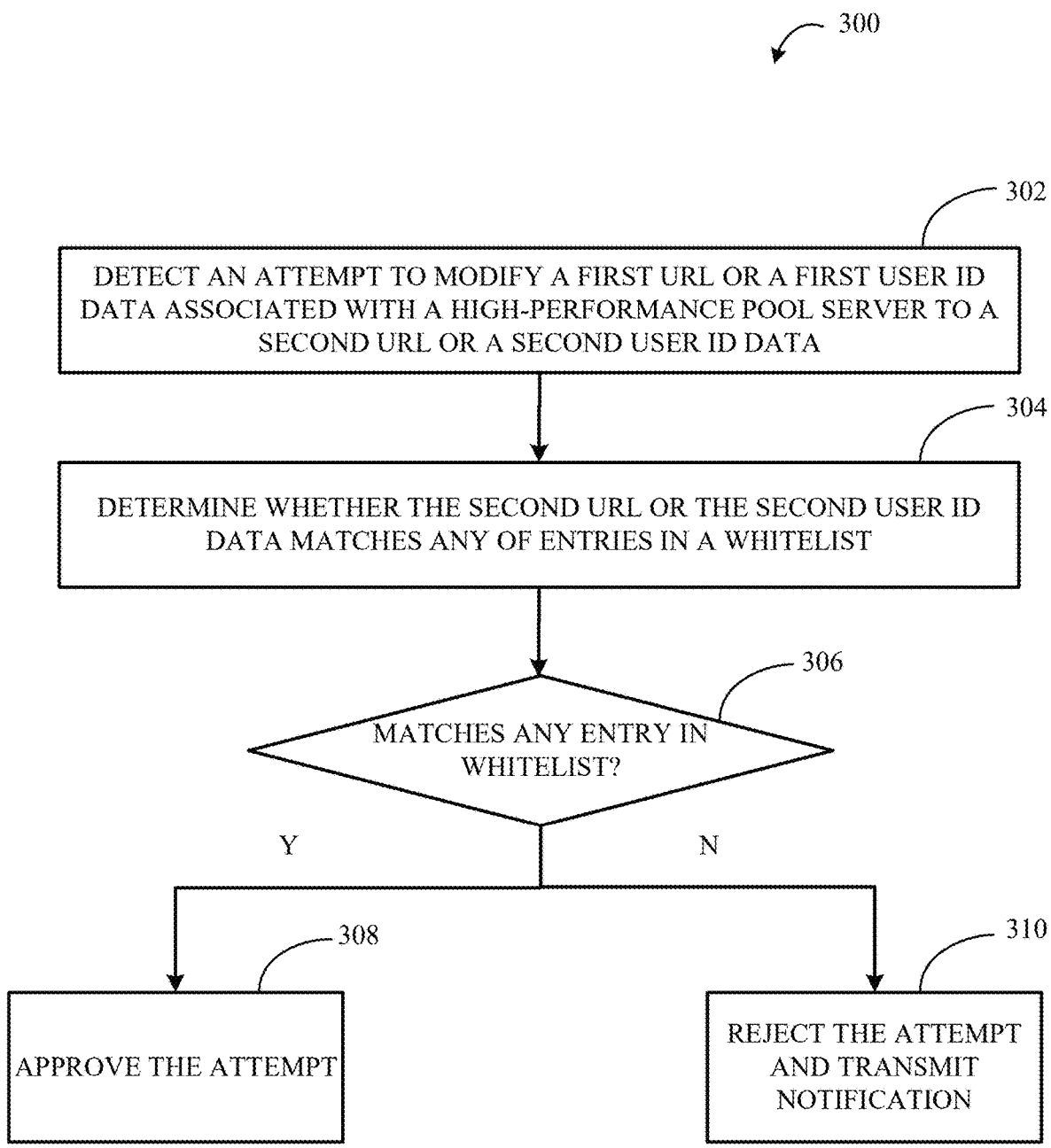
FIGS. 3 and 4 illustrate flow chart diagrams of example processes 300 and 400 for enhancing security of cryptomining pool management.
Figure 4:
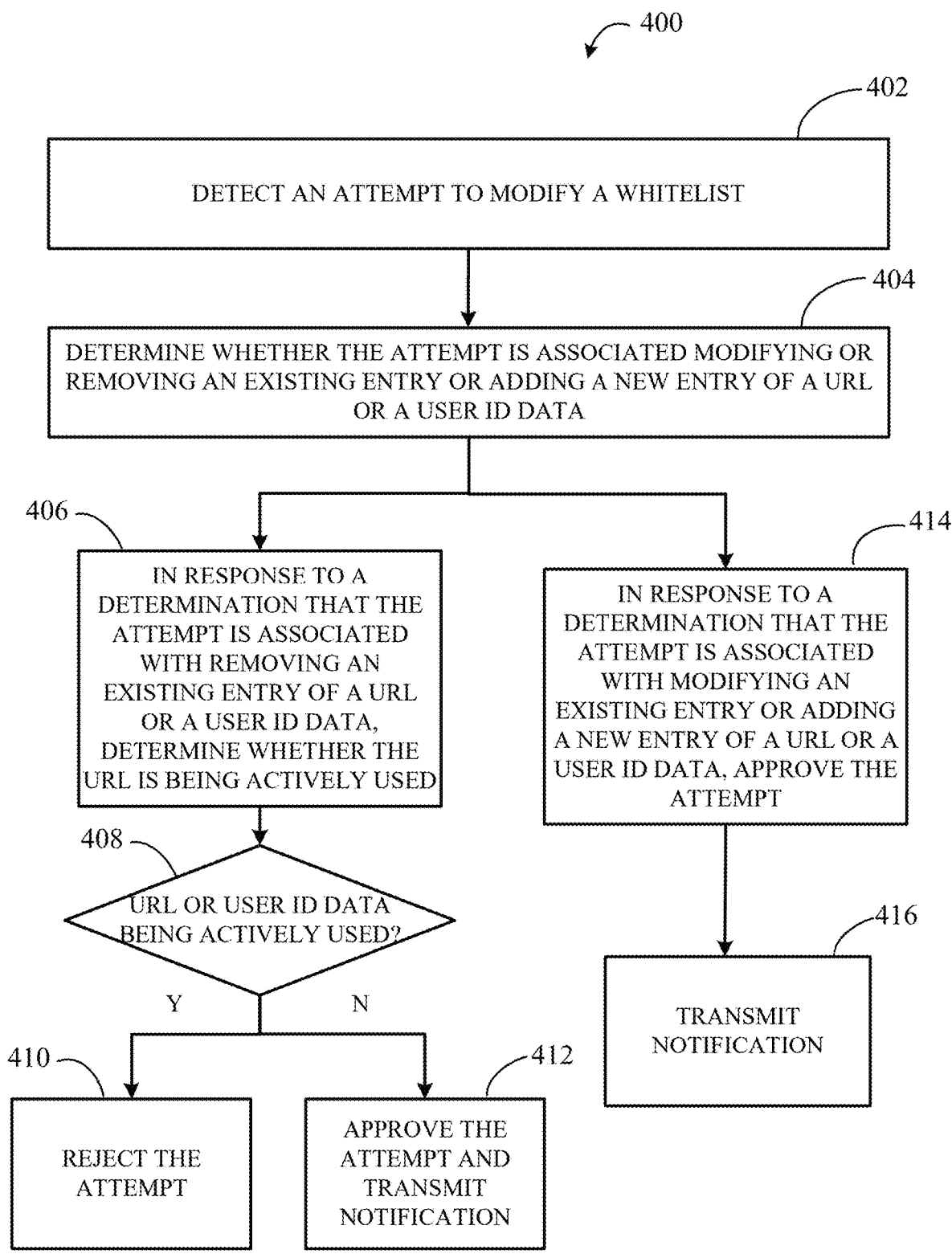

FIGS. 3 and 4 are flow chart diagrams of example processes 300 and 400 for enhancing security of cryptomining pool management. In particular, the example processes 300 and 400 can [1] configure a whitelist that includes a list of URLs of one or more pool servers and corresponding user ID data (e.g., user IDs), [2] detect (i) an attempt to modify a URL or a user ID associated with a mining asset and (ii) an attempt to modify the whitelist, [3] run security check against the whitelist, [4] grant or reject access based on the security check, and [5] transmit notification (e.g., to an electronic communication channel). The processes 300 and 400 can be implemented by a processor-based system, such as the cryptomining asset management system 100, and/or system 500 described below, and in conjunction with the example implementation 200, as described in this disclosure.

Referring to the process 300 of FIG. 3, at step 302, an attempt to modify a first URL or a first user ID data associated with a high-performance pool server to a second URL or a second user ID is detected. In some implementations, an asset management server can detect the attempt. In some implementations, the high-performance pool server can be a server that manages a plurality of IC chips (or mining assets) configured to perform high data-rate mathematical computations. In some implementations, a device controller (e.g., the device controller described above) that manages the plurality of IC chips (or the mining assets) can detect the attempt.

In some implementations, the first user ID data can be associated with a digital address of a cryptocurrency wallet of a first user. In some implementations, the second user ID can be associated with a digital address of a cryptocurrency wallet of a second user.

At steps 304 and 306, it is determined as to whether the second URL or the second user ID data matches any of entries in a whitelist. For instance, the second URL or the second user ID data can be compared to entries in the whitelist. In some implementations, the asset management server can make the determination. In some implementations, the device controller can make the determination.

At 308, in response to, or after determination that, the second URL or the second user ID data matches any of entries in the whitelist, the attempt is approved. For instance, the asset management server or the device controller can make the approval.

At 310, in response to, or after determination that, the second URL or the second user ID data does not match any of entries in the whitelist, the attempt is rejected. For instance, the asset management server or the device controller can make the rejection. Moreover, after, or in response to, the rejection, a notification indicating that the second URL or the second user ID data is not recognized can be transmitted to an electronic device associated with (or which was used to make the attempt).

In some implementations, the notification can be presented on a display corresponding to the electronic device. In some implementations, the notification can further indicate that the attempt is rejected.

In some implementations, the process can further include: detecting, by the asset management server or the device controller, an attempt to modify the whitelist; and upon determining that the attempt to modify the whitelist is by the root administrator of the asset management server: allowing a modification to the whitelist, and transmitting, to an electronic communication channel associated with the root administrator and one or more pool managing administrators, a second notification indicating that the whitelist has been modified. In some implementations, the whitelist is configured to be modified only by a root administrator of the asset management server. In some implementations, the whitelist is configured to be modified only by the root administrator or the one or more pool managing administrators. In some implementations, the second notification is transmitted to an electronic communication channel associated with the root administrator and all of the pool managing administrators.

In some implementations, transmitting the second notification includes transmitting notification data indicating at least (i) stored system configuration data associated with a user ID data regarding the modification to the whitelist (e.g., the user ID data that was subject to modification), (ii) an IP address of a device that made the attempt to modify the whitelist, and (iii) information conveying what has been modified in the whitelist. In some examples, the stored system configuration data associated with the user ID data can include at least one of (i) IP address, (ii) information about the PCB on which the plurality of IC chips are mounted, or (iii) information about a chassis in which the PCB is housed.

Moreover, in some implementations, when the device controller makes an attempt to modify the whitelist and such attempt is allowed upon determining that the attempt to modify the whitelist is made by the authorized user (e.g., the root administrator or in some cases both the root administrator and the pool managing administrators), a second notification indicating that the whitelist has been modified is transmitted (or pushed) first to a server such as the asset management server or the pool server. After the second notification is transmitted first to the server, then the server can transmit a third notification to an electronic communication channel associated with the root administrator and one or more pool managing administrators. The third notification can indicate that the whitelist has been modified.

In some examples, transmitting the third notification can include transmitting notification data indicating at least (i) stored system configuration data associated with a user ID data regarding the modification to the whitelist, (ii) an IP address of a device that made the attempt to modify the whitelist, and (iii) information conveying what has been modified in the whitelist. For instance, the stored system configuration data associated with the user ID data comprises at least one of (i) an internet protocol (IP) address, (ii) information about a printed circuit board on which the plurality of IC chips are mounted, or (iii) information about a chassis in which the printed circuit board is housed.

In some implementations, the process 300 can also detect an attempt to add new user ID data or new URL or remove an existing user ID data or an existing URL associated with the high-performance pool server. As described above, similar technique of running the security check against the whitelist, granting or rejecting attempt based on the security check, and transmitting notification, as well as other techniques described throughout the disclosure, e.g., including technique described with respect to FIG. 2, can be applied.

Moreover, the process 400 of FIG. 4 is described below.

At step 402, an attempt to modify a whitelist is detected. For instance, an electronic device (which can also be a server) managing a plurality of integrated circuit (IC) chips configured to perform high data-rate mathematical computations can detect the attempt to modify the whitelist.

At step 404, it is determined as to whether the attempt is associated with modifying or removing an existing entry, or adding a new entry of a URL or a user ID to the whitelist.

At steps 406 and 408, in response to a determination that the attempt is associated with removing an existing entry corresponding to a particular URL or a particular user ID, the electronic device determines whether the particular URL or the particular user ID is being actively used by one or more IC chips for performing high data-rate mathematical computations.

At step 410, after, or in response to, a determination that the particular URL or the particular user ID is being actively used, the electronic device rejects the attempt.

At step 412, after, or in response to, a determination that the particular URL or the particular user ID is not being actively used by the one or more IC chips, the electronic device (i) approves the attempt, and (ii) transmits, to an electronic communication channel associated with a root administrator and one or more pool managing administrators that manage one or more pool servers, a first notification indicating that the existing entry of the whitelist has been removed.

At step 414, in response to a determination that the attempt is associated with modifying an existing entry or adding a new entry to the whitelist, the electronic device approves the attempt. In some implementations, the whitelist is configured to be modified by only the root administrator. In some implementations, the whitelist is configured to be modified by the root administrator or the one or more pool managing administrators. In some implementations, detecting the attempt to modify the whitelist includes determining that the attempt is made by one of the root administrator or a pool managing administrator, and in response to the determination, approving the attempt.

At step 416, the electronic device transmits, to the electronic communication channel associated with the root administrator and the one or more pool managing administrators, a second notification indicating that the new entry has been added or the existing entry of the whitelist has been modified. In some implementations, the electronic device transmits the second notification to all of the root administrator and the pool managing administrators. In some implementations, transmitting the second notification includes: transmitting notification data indicating at least (i) stored system configuration data associated with a user ID data regarding the modification to the whitelist, (ii) an IP address of a device that made the attempt to modify the whitelist, and (iii) information conveying what has been modified in the whitelist. For instance, the stored system configuration data associated with the user ID data comprises at least one of (i) an internet protocol (IP) address, (ii) information about a printed circuit board on which the plurality of IC chips are mounted, or (iii) information about a chassis in which the printed circuit board is housed.

FIG. 5 is a block diagram of an example computer system 500 according to some implementations. Some components of the system 500 can be implemented as a cryptomining asset (e.g., the cryptomining asset 101), an asset management server (e.g., the asset management server 102), or a pool server (e.g., the pool server 103). The system 500 includes a processor 510, a memory 520, a storage device 530, and one or more input/output interface devices 540. Each of the components 510, 520, 530, and 540 can be interconnected, for example, using a system bus 550.

The processor 510 is capable of processing instructions for execution within the system 500. The term "execution" as used here refers to a technique in which program code causes a processor to carry out one or more processor instructions. In some implementations, the processor 510 is a single-threaded processor. In some implementations, the processor 510 is a multi-threaded processor. The processor 510 is capable of processing instructions stored in the memory 520 or on the storage device 530. The processor 510 may execute operations such as those described with reference to other figures described herein.

The memory 520 stores information within the system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 can include, for example, a hard disk device, an optical disk device, a solid-state drive, a flash drive, magnetic tape, or some other large capacity storage device. In some implementations, the storage device 530 may be a cloud storage device, e.g., a logical storage device including one or more physical storage devices distributed on a network and accessed using a network. In some examples, the storage device may store long-term data. The input/output interface devices 540 provide input/output operations for the system 500. In some implementations, the input/output interface devices 540 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 500 to communicate, for example, transmit and receive data. In some implementations, the input/output device can include driver devices configured to receive input data and send output data to other input/output devices, e.g., keyboard, printer and display devices 560. In some implementations, mobile computing devices, mobile communication devices, and other devices can be used.

A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 500 is contained within a single integrated circuit package. A system 500 of this kind, in which both a processor 510 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 540.

Although an example processing system has been described in FIG. 5, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A method comprising:
   detecting, by an asset management server, an attempt to modify at least one of (i) a first uniform resource locator (URL) or (ii) a first user identification (ID) data associated with a pool server managing a plurality of integrated circuit (IC) chips configured to perform high data-rate mathematical computations, to at least one of (i) a second URL or (ii) a second user ID data, respectively;
   determining, by the asset management server, whether (i) the second URL or (ii) the second user ID data matches information in one of a plurality of entries in a whitelist, wherein each entry of the plurality of entries comprises a URL and a corresponding user ID;
   in response to a determination that the second URL or the second user ID data matches information in one of the entries in the whitelist, approving the attempt; and
   in response to a determination that the second URL or the second user ID data does not match information in any of the entries in the whitelist:
      rejecting the attempt, and
      transmitting, by the asset management server to an electronic device associated with the attempt, a notification indicating that the second URL or the second user ID data is not recognized;
   detecting, by the asset management server, an attempt to modify the whitelist, wherein the whitelist is configured to be modified by a root administrator of the asset management server; and
   upon determining that the attempt to modify the whitelist is by the root administrator of the asset management server:
      allowing a modification to the whitelist, and
      transmitting, to an electronic communication channel associated with the root administrator and one or more pool managing administrators, a second notification indicating that the whitelist has been modified.

2. The method of claim 1, wherein the notification is presented on a display corresponding to the electronic device.

3. The method of claim 1, wherein the notification further indicates that the attempt is rejected.

4. The method of claim 1, wherein the first user ID data is associated with a digital address of a cryptocurrency wallet of a user.

5. The method of claim 1, wherein transmitting the second notification comprises:
   transmitting notification data indicating at least (i) stored system configuration data associated with a user ID data regarding the modification to the whitelist, (ii) an IP address of a device that made the attempt to modify the whitelist, and (iii) information conveying what has been modified in the whitelist.

6. The method of claim 5, wherein the stored system configuration data associated with the user ID data comprises at least one of (i) an internet protocol (IP) address, (ii) information about a printed circuit board on which the plurality of IC chips are mounted, or (iii) information about a chassis in which the printed circuit board is housed.

7. The method of claim 5, wherein the information conveying what has been modified comprises (i) a modified value of the URL or the user ID data and (ii) a previous value of the URL or the user ID data.

8. The method of claim 1, wherein the whitelist is configured to be modified by the root administrator or the one or more pool managing administrators, the method further comprising:
   detecting, by the asset management server, an attempt to modify the whitelist; and
   upon determining that the attempt to modify the whitelist is by the one or more pool managing administrators:
      allowing a modification to the whitelist, and
      transmitting, to the electronic communication channel associated with the root administrator and the one or more pool managing administrators, a third notification indicating that the whitelist has been modified.

9. The method of claim 8, wherein transmitting the second notification comprises:
   transmitting notification data indicating at least (i) stored system configuration data associated with a user ID data regarding the modification to the whitelist, (ii) an IP address of a device that made the attempt to modify the whitelist, and (iii) information conveying what has been modified in the whitelist.

10. The method of claim 1, wherein the root administrator corresponds to an entity or a user that manages the pool server, the asset management server, and the pool managing administrators, and
    wherein transmitting, upon determining that the attempt to modify the whitelist is by the root administrator, the second notification to the electronic communication channel associated with the root administrator and one or more pool managing administrators comprises:
       transmitting the second notification to the electronic communication channel associated with the root administrator and all of the pool managing administrators.

11. A method comprising:
    detecting, by a device controller managing a plurality of integrated circuit (IC) chips configured to perform high data-rate mathematical computations, an attempt to modify at least one of (i) a first uniform resource locator (URL) or (ii) a first user identification (ID) data associated with a pool server to (i) a second URL or (ii) a second user ID data, respectively;
    determining, by the device controller, whether (i) the second URL or (ii) the second user ID data matches information in one of a plurality of entries in a whitelist, wherein each entry of the plurality of entries comprises a URL and a corresponding user ID;
    in response to a determination that the second URL or the second user ID data matches information in one of the entries in the whitelist, approving the attempt;
    in response to a determination that the second URL or the second user ID data does not match information in any of the entries in the whitelist:
       rejecting the attempt, and
       transmitting a notification indicating a message that the second URL or the second user ID data is not recognized,
    detecting, by the device controller, an attempt to modify the whitelist, wherein the whitelist is configured to be modified by a root administrator that manages the pool server; and upon determining that the attempt to modify the whitelist is by the root administrator:
allowing a modification to the whitelist,
transmitting, by the device controller and to an asset management server, a second notification indicating that the whitelist has been modified, and
transmitting, by the asset management server and to an electronic communication channel associated with the root administrator and one or more pool managing administrators, a third notification indicating that the whitelist has been modified.

12. The method of claim 11, wherein the first user ID data is associated with a digital address of a cryptocurrency wallet of a user.

13. The method of claim 11, wherein transmitting the third notification comprises:
transmitting notification data indicating at least (i) stored system configuration data associated with a user ID data regarding the modification to the whitelist, (ii) an IP address of a device that made the attempt to modify the whitelist, and (iii) information conveying what has been modified in the whitelist.

14. The method of claim 13, wherein the stored system configuration data associated with the user ID data comprises at least one of (i) an internet protocol (IP) address, (ii) information about a printed circuit board on which the plurality of IC chips are mounted, or (iii) information about a chassis in which the printed circuit board is housed.

15. The method of claim 11, wherein the whitelist is configured to be modified by the root administrator or the one or more pool managing administrators that manage the pool server, the method further comprising:
detecting, by the device controller, an attempt to modify the whitelist; and
upon determining that the attempt to modify the whitelist is by the one or more pool managing administrators:
allowing a modification to the whitelist,
transmitting, by the device controller and to an asset management server, a fourth notification indicating that the whitelist has been modified, and
transmitting, by the asset management server and to the electronic communication channel associated with the root administrator and the one or more pool managing administrators, a fifth notification indicating that the whitelist has been modified.

16. The method of claim 15, wherein transmitting the third notification comprises:
transmitting notification data indicating at least (i) stored system configuration data associated with a user ID data regarding the modification to the whitelist, (ii) an IP address of a device that made the attempt to modify the whitelist, and (iii) information conveying what has been modified in the whitelist.

17. A method for enhancing security for cryptocurrency mining pool, the method comprising:
detecting, by an electronic device managing a plurality of integrated circuit (IC) chips configured to perform high data-rate mathematical computations, an attempt to modify a whitelist that comprises a plurality of entries, wherein each entry of the plurality of entries comprises a URL and a corresponding user ID;
determining whether the attempt is associated with modifying an existing entry, removing the existing entry, or adding a new entry of a URL or a user ID to the whitelist;
in response to a determination that the attempt is associated with removing an existing entry corresponding to a particular URL or a particular user ID:
determining whether the particular URL or the user ID is being actively used by one or more IC chips for performing high data-rate mathematical computations;
based on a determination that the particular URL or the user ID is not being actively used by the one or more IC chips, (i) approving the attempt, and (ii) transmitting, to an electronic communication channel associated with a root administrator and one or more pool managing administrators that manage one or more pool servers, a first notification indicating that the existing entry of the whitelist has been removed; and
in response to a determination that the attempt is associated with modifying an existing entry or adding a new entry to the whitelist, (i) approving the attempt, and (ii) transmitting, to the electronic communication channel associated with the root administrator and the one or more pool managing administrators, a second notification indicating that the new entry has been added or the existing entry of the whitelist has been modified.

18. The method of claim 11, wherein the root administrator corresponds to an entity or a user that manages the pool server, the asset management server, and the pool managing administrators, and
wherein transmitting, upon determining that the attempt to modify the whitelist is by the root administrator, the third notification to the electronic communication channel associated with the root administrator and one or more pool managing administrators comprises:
transmitting the third notification to the electronic communication channel associated with the root administrator and all of the pool managing administrators.

19. The method of claim 17, wherein the whitelist is configured to be modified by the root administrator or the one or more pool managing administrators, and
wherein detecting the attempt to modify the whitelist comprises:
determining that the attempt is made by one of the root administrator or a pool managing administrator; and
in response to the determination, approving the attempt.

20. The method of claim 17, wherein transmitting the second notification comprises:
transmitting notification data indicating at least (i) stored system configuration data associated with a user ID data regarding the modification to the whitelist, (ii) an IP address of a device that made the attempt to modify the whitelist, and (iii) information conveying what has been modified in the whitelist.

* * * * *